B. V. NORDBERG.
COMPRESSED AIR ENGINE.
APPLICATION FILED AUG. 3, 1906.

926,819.

Patented July 6, 1909.
8 SHEETS—SHEET 3.

B. V. NORDBERG.
COMPRESSED AIR ENGINE.
APPLICATION FILED AUG. 3, 1906.

926,819.

Patented July 6, 1909.
8 SHEETS—SHEET 6.

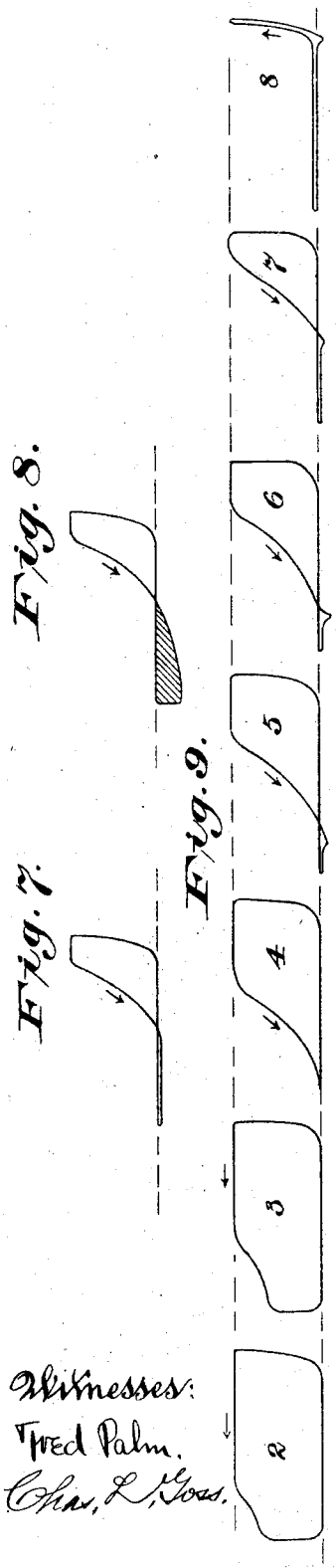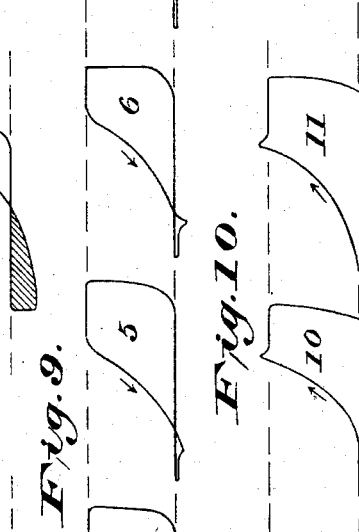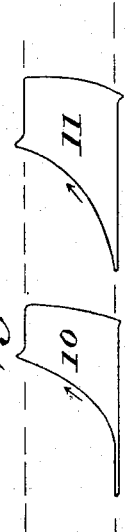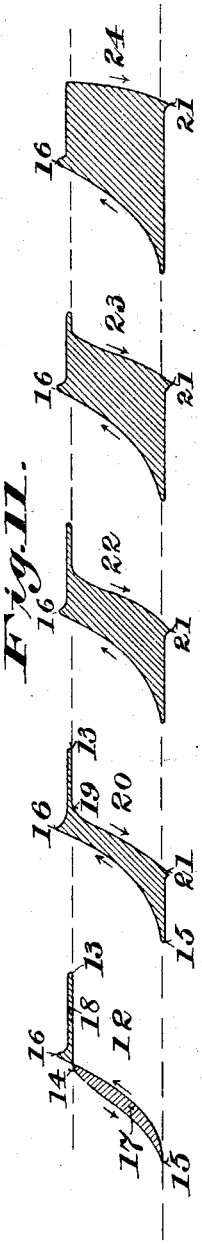

B. V. NORDBERG.
COMPRESSED AIR ENGINE.
APPLICATION FILED AUG. 3, 1906.

926,819.

Patented July 6, 1909.
8 SHEETS—SHEET 8.

Witnesses:
Fred Palm
Chas. L. Goss

Inventor:
Bruno V. Nordberg
By Winkler Flanders Bottum & Fawsett
Attorneys.

UNITED STATES PATENT OFFICE.

BRUNO V. NORDBERG, OF MILWAUKEE, WISCONSIN.

COMPRESSED-AIR ENGINE.

No. 926,819.          Specification of Letters Patent.          Patented July 6, 1909.

Application filed August 3, 1906. Serial No. 328,986.

*To all whom it may concern:*

Be it known that I, BRUNO V. NORDBERG, a citizen of the United States, residing at Milwaukee, in the county of Milwaukee and State of Wisconsin, have invented certain new and useful Improvements in Compressed-Air Engines, of which the following is a specification, reference being had to the accompanying drawing, forming a part thereof.

The main objects of this invention are to economize power in the operation of engines subject to varying loads, and particularly such as change from positive to negative, requiring the application of a brake or retarding power, to control and regulate the speed of such engines with certainty and ease, and generally to improve the construction and operation of engines such as hoisting engines, the loads of which are subject to constant and great variations.

It consists in certain novel features of construction and in the peculiar arrangement and combinations of parts as hereinafter particularly described and pointed out in the claims.

In the accompanying drawing like characters designate the same or similar parts in the several figures.

Figure 1:
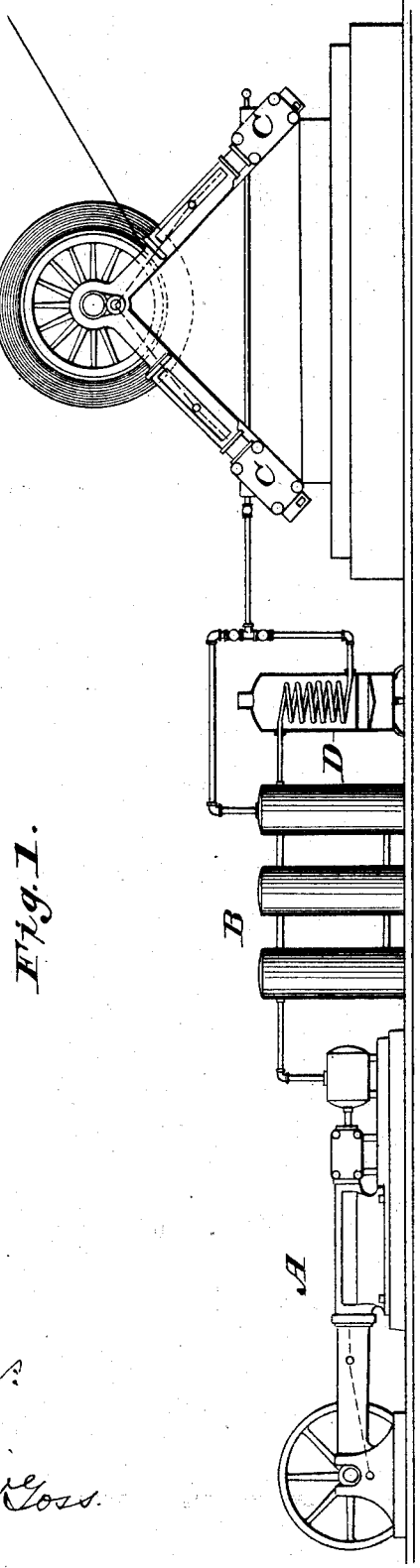
Figure 2:
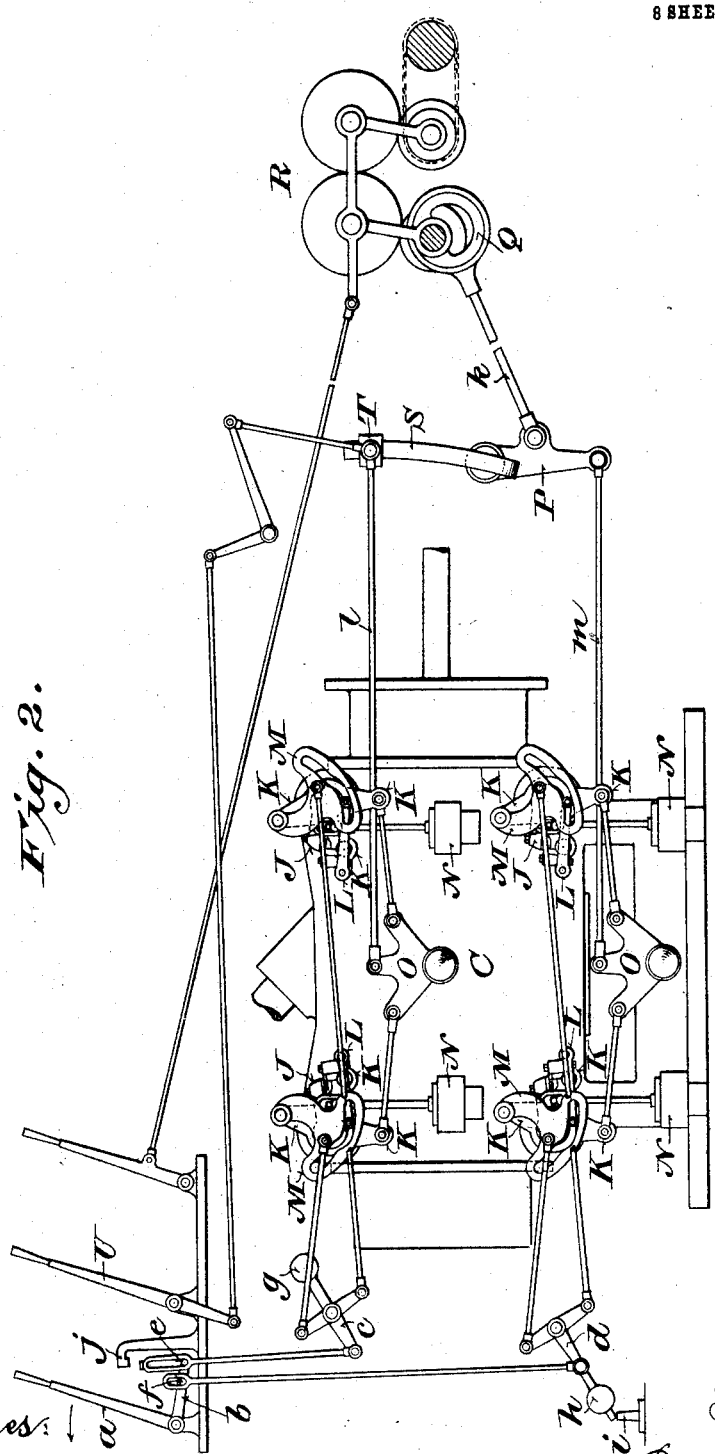
Figure 3:
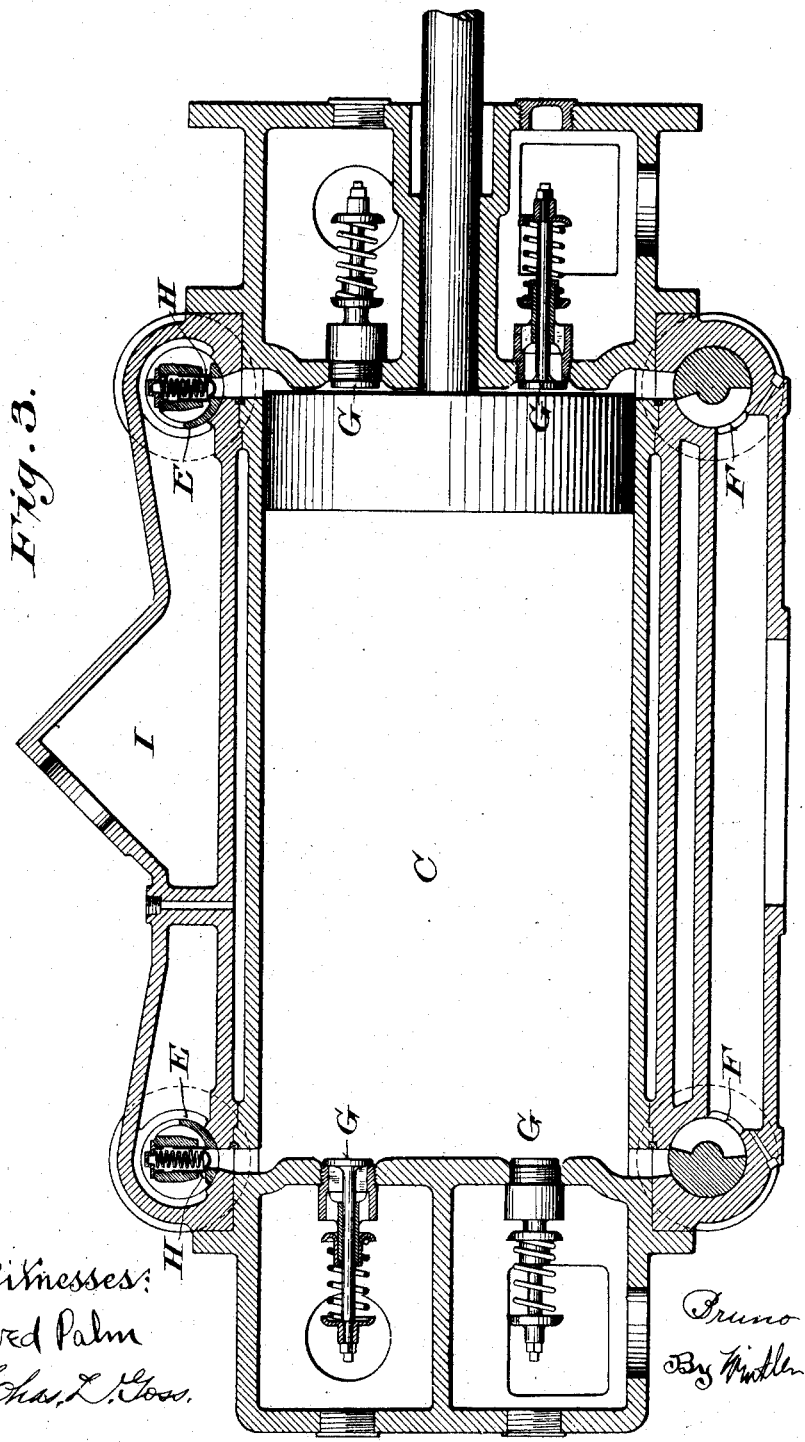
Figure 4:
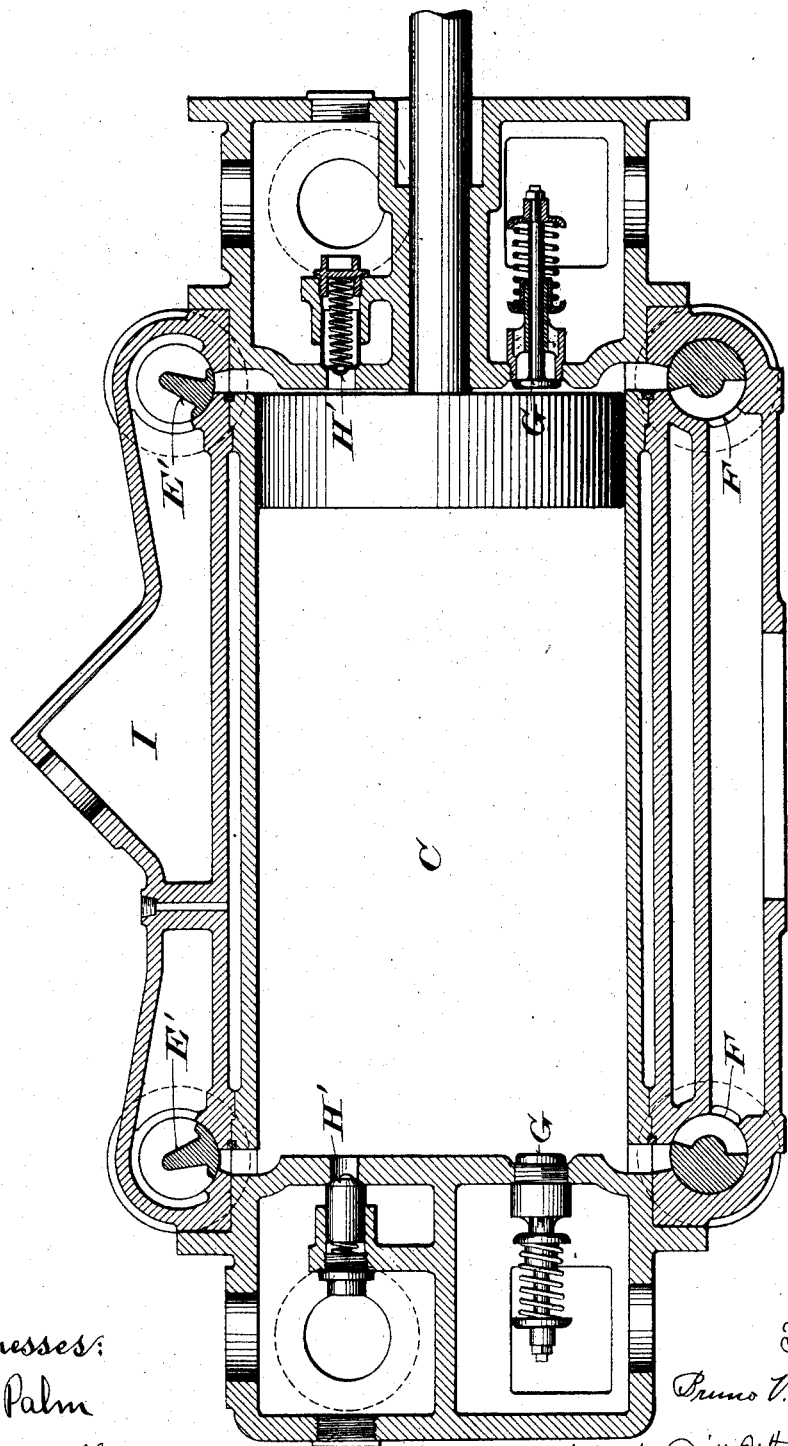
Figure 5:
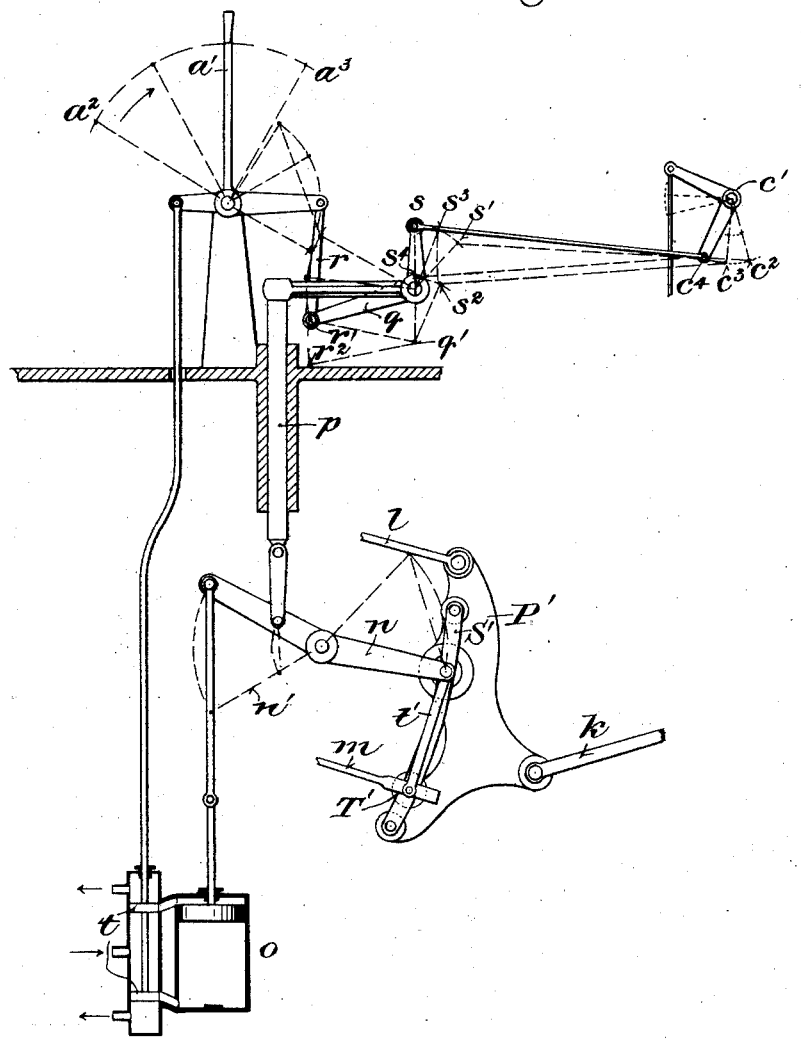
Figure 6:
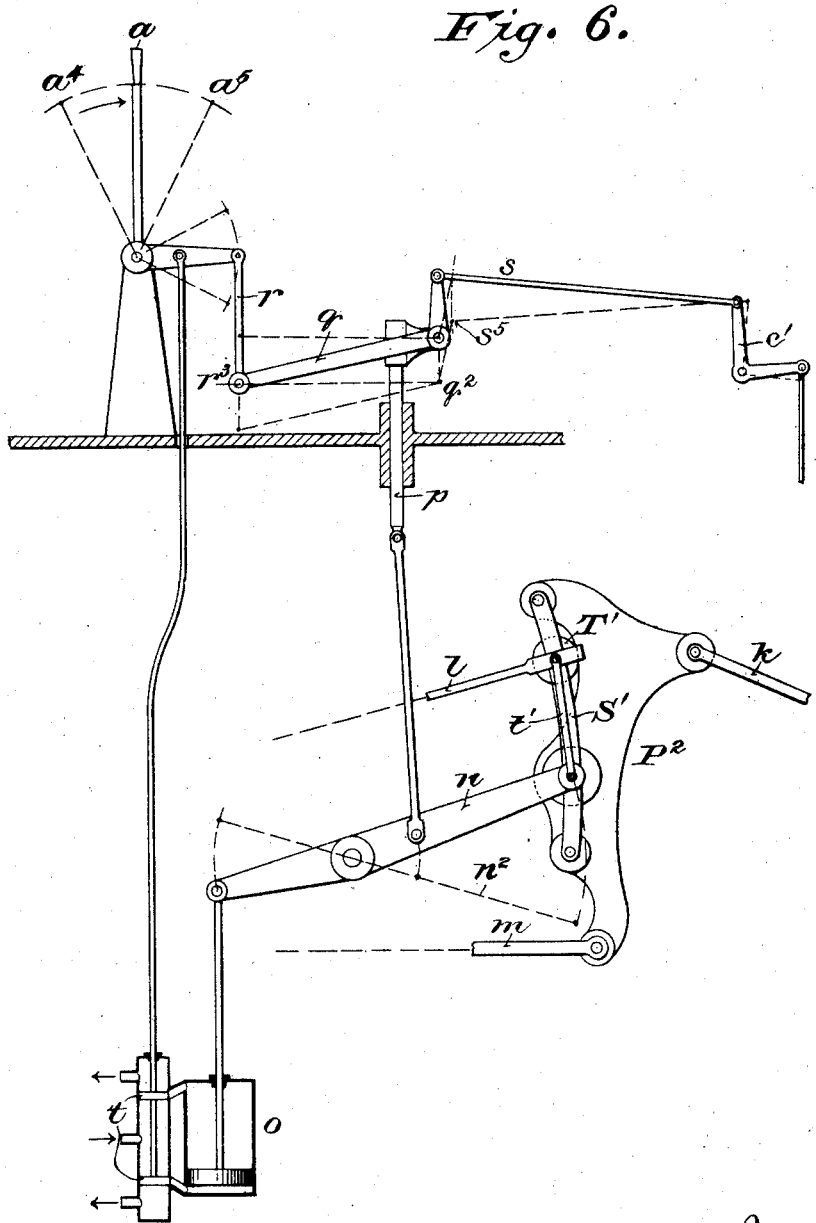
Figure 13:
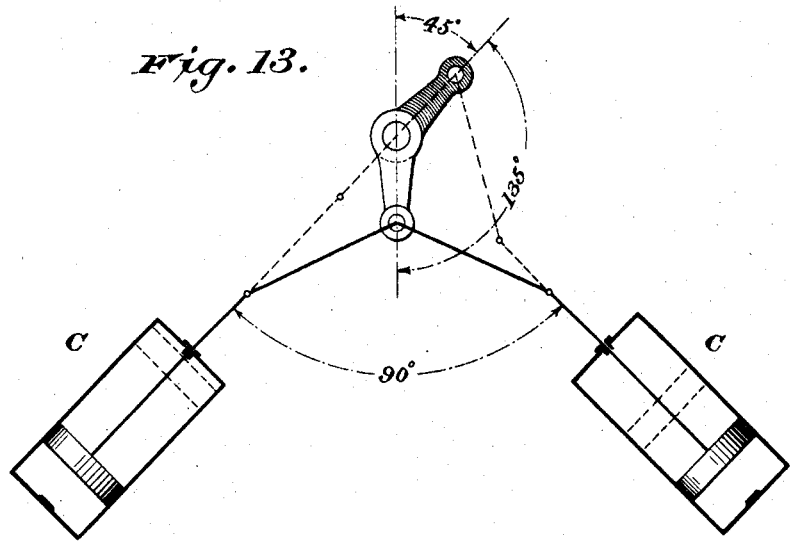
Figure 14:
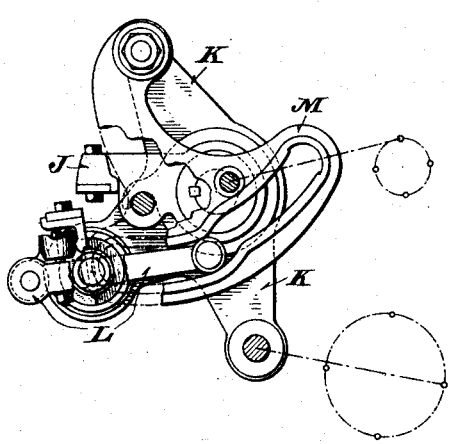
Figure 15:
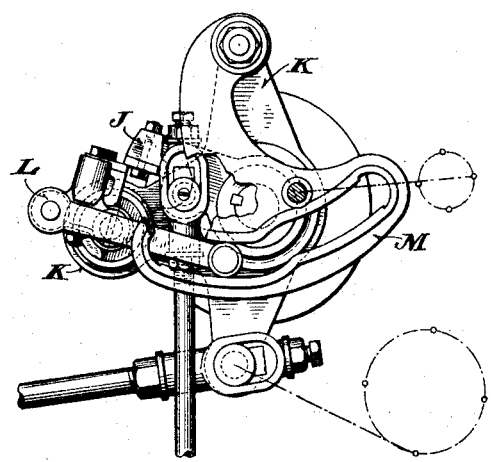

Figure 1 is a general view of a hoisting engine and accessories arranged in accordance with the invention; Fig. 2 is an enlarged view of an engine cylinder with valve operating and reversing gear and valve controlling and regulating connections as arranged for one of various methods of control and regulation which may be employed; Fig. 3 is an axial section on a still larger scale of a cylinder with one arrangement of valves suitable for use in an engine embodying the present invention; Fig. 4 is a like view showing a modified arrangement of the valves; Fig. 5 is a diagrammatic view illustrating connections for controlling and regulating the operation of the engine according to another method; Fig. 6 is a similar view showing a modified arrangement for controlling and regulating the operation of the engine according to still another method; Figs. 7 to 12 inclusive are indicator cards or diagrams illustrating the operation of the engine according to various methods of control and regulation hereinafter explained; Fig. 13 is a diagram showing in connection with Fig. 1, one of the various arrangements of the engine cylinders and one of various ways of connecting the pistons with the crank shafts which may be followed in the embodiment of the invention; Fig. 14 is a detail view on an enlarged scale of the valve operating and releasing gear associated with each inlet and exhaust valve, the valve closing arm being released and in closed position; and Fig. 15 is a similar view showing the valve closing arm engaged by the trip arm in the operation of opening the valve.

With a hoisting engine constructed and operated in accordance with the present invention as hereinafter described, the losses resulting from the use of brakes to control and regulate the speed, according to the present practice, and other objections are eliminated or reduced to a minimum. To accomplish this and to attain the objects hereinbefore stated, compressed air is used as a motive power, and in place of a brake, provision is made whereby the hoist is retarded, and the energy absorbed in its retardation stored up for future use.

Referring to Figs. 1 and 2 of the accompanying drawing, the present system comprises the following parts: an air compressor A, an air storage reservoir B, and an engine having one or more cylinders C and convertible as hereinafter explained, from a motor into a compressor and vice versa. The air storage reservoir may consist of a series of receivers, as shown in Fig. 1, or the air pipe system of a mine may under certain conditions be utilized for the purpose. The system preferably includes a heater D for heating the compressed air supplied to the engine from the reservoir B, and to this end, branch or separate supply and return connections provided with check valves between the reservoir and engine are arranged so that the air passing from the reservoir to the engine will be heated while the air returned by the engine to the reservoir will pass around the heater and not be affected thereby. Each cylinder of the engine, as shown in Fig. 3, is provided with inlet valves E and exhaust valves F, which may be of the semirotative Corliss type. It is also provided with automatic or self-acting suction valves G and with automatic or self-acting discharge valves H, which in the present instance are mounted in the inlet valves E. The construction and location of the valves may however, be varied and they may be arranged as shown in Fig. 4, in which the discharge valves H' like the suction valves G are mounted in the cylinder heads apart from the inlet valves E'. With this arrangement extra passages or pipes are required to connect the discharge valve chambers with the discharge or pressure chest I, or with some part of the compressed air storage system.

In the practical embodiment of the invention either or both the inlet and the exhaust valves may be provided with variable cutoff or releasing gear of any suitable kind, preferably such as will admit of closing the valves at any point in the stroke of the piston. Full stroke releasing gear, in principle like or similar to that shown and described in United States Letters Patent No. 680,667 issued to me August 13, 1901, is well adapted for the purpose, and is shown in Fig. 2, in which J designates the valve closing arms immovably fixed on the stems of the valves E and F, K the valve opening arms movable independently of the arms J, L trip arms pivoted to the arms K, and M trip cams also pivoted to the arms K and engaging the trip arms L. The valve closing arms are connected in the usual or any suitable manner with the plungers of dash pots N, by which the valves are instantly closed when they are released. The valve opening arms K are connected with wrist plates O. The wrist plates O are connected with a rocker P which is in turn actuated by an eccentric Q, in the present case driven from the crank shaft of the engine and forming part of a reversing gear R. While this reversing gear is necessary or desirable for reversing the valve mechanism and the rotation of the engine shaft, it does not form a part of the valve controlling and regulating mechanism for varying the driving and retarding power applied to the engine.

A sword arm S forms a part of the rocker P as shown in Fig. 2, and the rod which operates the inlet valves is connected with said arm by a sliding pivot block T, which may be moved by a lever U to a point opposite the fulcrum of the rocker so as to render the inlet valves inoperative in their central or closed position; but this sword arm may be dispensed with when a full stroke valve releasing gear like that above referred to is employed, or other means are provided for setting the inlet valves in their closed position.

The object of the automatic or self-acting suction valves G is to admit atmospheric air into the cylinders whenever the expansion in the cylinder reduces the pressure therein to that of the atmosphere before the end of the stroke of the piston, as shown by the diagram, Fig. 7. If there were no such valves, the pressure in the cylinder would drop below that of the atmosphere and again rise to the atmosphere at the end of the stroke, as shown by the diagram Fig. 8. The shaded portion of this diagram represents a load on the engine and consequent loss of efficiency, to avoid which the engine is provided with the valves G.

To control and regulate the operation of the engine with greater facility and certainty by the means and methods herein set forth, a number of cylinders arranged and having their pistons connected with the crank shaft so as to produce a uniform rotative effect thereon, is desirable. Fig. 13 in connection with Fig. 1, shows one of various arrangements which may be employed. According to this arrangement the engine is provided with four double acting cylinders, two at each end of the crank shaft which has a crank at each end connected with the pistons of the two cylinders at that end by piston and connecting rods, in the usual manner. The cylinders of each pair are arranged with their center lines at an angle of 90 degrees to each other, while the cranks are set at an angle of 135 degrees to each other, the connections between one pair of pistons and one crank being shown by full lines, and the connections between the other pair of pistons and the other crank being indicated by dotted lines in Fig. 13. With this arrangement it is clear that one of the pistons is brought into its most advantageous position at every 45 degrees of the rotation of the crank shaft. Various means and methods may be employed with like or similar results to control and regulate the driving or accelerating power as well as the retarding or braking power applied to the engine. Three methods, involving certain modifications in the valve operating gear, will be explained.

Method 1: According to this method the exhaust valves as well as the inlet valves, are provided with variable releasing gear, as shown in Fig. 2. This releasing gear is adapted to release the exhaust valves and permit them to close at any point of the compressing stroke of the piston, and may be adjusted by the same lever or connection that adjusts the releasing gear of the inlet valves. A hand lever $a$ is formed or provided with a crank arm $b$. This crank arm is connected with the trip levers $c$ and $d$ by rods having looped or slotted ends engaging pins $e$ and $f$ on said arm. The fulcrums of the trip levers $c$ and $d$ are movable toward and from the trip cams M and are reciprocated synchronously with the wrist plates O by an eccentric, as shown in said Patent No. 680,677, or by other suitable actuating means. The lever $c$ is connected with the trip cams M of the inlet valves, while the lever $d$ is connected with the trip cams M of the exhaust valves. The lever $c$ is provided with a weight $g$ which tends to turn it to the position of shortest cutoff or earliest release, this tendency being resisted by the engagement of the pin *e* with the lower end of the loop or slot in the rod connecting the crank arm *b* with the lever *c*. The lever *d* is provided with a counterweight *h* which tends to turn it toward and hold it against a stop *i*, in which position the exhaust valves F are not released by the cams M, but are held open by the valve operating gear during the compressing strokes of the piston. A stop *j* is arranged to limit the motion of the trip lever *c* when it arrives at a position in which it prevents the opening of the inlet valves, the lever *a* being moved in the direction indicated by the arrow, thereby permitting the weight *g* to turn the lever *c* in the direction of shortest cutoff or earlier release. The position of this stop is such that when the movement of the lever *c* is arrested thereby, the pin *f* is brought into engagement with the upper end of the loop or slot of the rod connecting the arm *b* with the lever *d*, and any further movement of the lever *a* in the direction indicated by the arrow will lift the weight *h* and turn the lever *d* in the direction of earlier release. The operation of the engine according to this method of control and regulation is as follows: In the position of the parts of the valve adjusting and releasing mechanism shown in Fig. 2, compressed air is admitted into the expanding end of the cylinder during nearly the full stroke of the piston, and will be exhausted from the other end of the cylinder during all of said stroke of the piston, as indicated by the diagram 2, Fig. 9, the horizontal portion of the upper line of said diagram representing the period of admission, and the lower horizontal line of the diagram representing the period of exhaust. As the hand lever is moved in the direction of the arrow, the weight *g* turns the trip lever *c* in the direction of shorter cutoff or earlier release of the inlet valves, effecting a greater expansion of the air and reducing the driving or accelerating power applied to the engine according to the series of indicator cards or diagrams shown in Fig. 9. When the lever *a* reaches the position at which the air is expanded in the cylinder to atmospheric or exhaust pressure, the card or diagram 4 is produced. By moving said lever still farther in the same direction, the tendency of the air is to expand below atmospheric or exhaust pressure, and the automatic or self-acting suction valves G are then opened and diagrams or indicator cards corresponding with those designated 5, 6 and 7, Fig. 9, are produced. When the lever *a* has been moved into position to carry the upper end of the rod connecting the arm *b* with the lever *c* into engagement with the stop *j*, the trip cams M of the inlet valves are adjusted to prevent the opening of said valves, and no compressed air is admitted into the cylinder from the reservoir B. In this position of the controlling lever *a* the engine produces an indicator card corresponding with the diagram 8, Fig. 9.

The pin *f* having been brought by the above mentioned movement of the lever *a* into engagement with the upper end of the loop or slot of the rod connecting the arm *b* with the lever *d*, a further movement of said lever *a* in the same direction lifts the weight *h* and turns the trip lever *d* in a direction to release the exhaust valves and permit their closing earlier, at first near the end of the stroke of the piston and finally at the extreme limit of the movement of the lever *a*, preventing the opening of said valves. The effect of this upon the work performed in the cylinder may be explained as follows: Assuming that the lever *a* is set so as to release the exhaust valves at mid stroke, and assuming that the piston has passed the back dead center and is beginning to travel toward the front or crank end of the cylinder, no air is admitted from the chest I, since the trip mechanism of the inlet valves is so set as to prevent the opening of these valves. The exhaust valve F at the back end of the cylinder is closed, so that the automatic suction valve or valves G at that end of the cylinder must open to admit atmospheric air into the enlarging space between the piston and the back cylinder head during the entire forward stroke of the piston. A little before this stroke is completed the back exhaust valve commences to open and the automatic suction valve closes, atmospheric air being now drawn into the cylinder through the open exhaust valve. The piston having passed the forward dead center and moving toward the back head, the air in the diminishing space between said head and the piston is expelled through the back exhaust valve, which is still opening. As the piston arrives at mid stroke the exhaust valve is released and the air confined in the cylinder is compressed as the space it occupies is reduced until it reaches the pressure of the air in the chest I, whereupon the automatic or self-acting discharge valve H or H' opens and the air thus compressed is forced into said chest. The engine is thus converted from a motor into a compressor by which any desired volume of air up to the entire contents of the cylinder, may be compressed from atmospheric pressure to the pressure employed for driving the engine, and the air so compressed added to the supply in the reservoir B. The increasing work or retarding or braking power to which the engine acting as a compressor is thus subjected, is illustrated by the indicator cards or diagrams 9, 10, 11, Fig. 10. The power for this compression of air is derived from the overbalance of the ascending masses elevated by the engine or from their momentum, or from both combined, and such compression thus serves as a brake, with this difference, that while a brake transforms the energy absorbed by it into heat, which is dissipated in the surrounding atmosphere, the air compression adds nearly all the absorbed energy to the supply available for operating the engine, including even a large part of the heat generated by compression.

Method 2: By this method the driving or accelerating power is controlled and regulated as in Method 1, by changing the point of cutoff or release of the inlet valves E or E' according to the demand for such power. The retarding or braking power is controlled and regulated by the same means which control and regulate the driving or accelerating power, and no variable releasing gear is used in connection with the exhaust valves. The exhaust valves may be operated in the ordinary way by the eccentric which operates the inlet valves, but a sword arm or equivalent device is used in connection with the exhaust valve gear to set the exhaust valves in their closest position and render them inactive in that position. This arrangement is similar to that used in connection with the inlet valves according to Method 1. To control and regulate the speed of the engine according to this method, the driving or accelerating power is varied by changing the point of cutoff or release of the inlet valves as in Method 1, being gradually diminished by adjusting the releasing gear to close the inlet valves earlier, thereby increasing the expansion of the air, as illustrated by the series of indicator cards or diagrams in Fig. 9. When the last card or diagram 8 of this series is produced no power is consumed or developed by the engine (excluding the friction of the machine).

To convert the engine from a motor into a compressor and to apply the retarding power, the valve operating and releasing gear is adjusted to set and keep the exhaust valves closed and to release and close the inlet valves at such point in the stroke of the piston that the volume of air admitted by them into the cylinder will expand to atmospheric or exhaust pressure at the end of the stroke, and will be recompressed to the pressure in the chest I or reservoir, by the return stroke. Under the conditions last stated, the air expands in the enlarging end of the cylinder and the pressure drops from that maintained in the pressure chest to atmospheric pressure or the exhaust pressure of the engine. The exhaust valves being closed, the air confined in the diminishing or contracting end of the cylinder is recompressed to its initial pressure or that maintained in the pressure chest. An indicator card corresponding with diagram 12, Fig. 11, is thus produced. According to this diagram, air is admitted from 13 to 14. At 14 expansion begins and from this point the pressure falls to that of the atmosphere or exhaust pressure of the engine at 15, the end of the stroke. From this point the air in the cylinder is recompressed to or slightly above the pressure in the pressure chest at 16, approximately this pressure remaining on the piston to the end of its stroke. The expansion line will not exactly coincide with that of the compression line, for the reason that during the expansion of the air its temperature drops below that of the atmosphere and thus some heat will be absorbed from the surrounding walls of the cylinder and piston and its pressure will be a little higher than that corresponding with its expansion unaffected by variation in temperature. In like manner the pressure during the compression will be slightly lower than that due to compression alone, unaffected by other causes, because the air is heated during compression above the temperature of the surrounding walls and will impart some of its heat thereto. A small amount of power represented by the area 17 will thus be developed in this position of the valve operating and releasing gear, but this is or may be partly or entirely counteracted by the work or loss of power represented by the area 18, due to the passage of the air through the discharge valves.

To increase the retarding or braking power, the valve releasing gear is adjusted to release and close the inlet valves earlier in the stroke, say at point 19, in diagram 20, Fig. 11. Air is then admitted to the cylinder from 13 to 19. At 19 expansion begins and the pressure in the cylinder drops to or slightly below atmospheric or exhaust pressure at 21. As the piston passes this point, the automatic suction valve G behind the piston opens and atmospheric air is drawn into the cylinder until the piston reaches the end of its stroke at 15. On the return stroke the air in the cylinder is compressed as before to the point 16, where it reaches or slightly exceeds the pressure in the chest I. The automatic discharge valve H or H' toward which the piston is advancing, now opens, and the compressed air is forced into the chest I or compressed air reservoir at the pressure existing therein. The retarding power thus developed in the cylinder is represented by the shaded areas of the several indicator cards or diagrams 20, 22, 23 and 24, Fig. 11.

By moving the operating lever to its limit in the same direction the retarding power which is developed by and tends to check the speed of the engine is gradually increased, as illustrated by the series of diagrams in Fig. 11. The operating lever should be so connected with the valve operating and releasing gear that by moving it in one direction it will produce the various effects in the order in which they are mentioned above. Thus in one extreme position it should apply the accelerating power with its full force, and by gradually moving it toward its central position the accelerating power should be gradually diminished until at the central position of the lever it should be zero. A further movement in the same direction should apply the retarding power first with the least force and finally at the extreme position of the lever with its full force, as shown by the indicator card or diagram 24, Fig. 11.

Referring to Fig. 5, showing mechanism adapted to control and regulate the operation of the engine according to this method, P' is a rocker driven by a rod $k$ from the eccentric Q of the reversing gear or other convenient part of the engine. This rocker is connected by a rod $l$ with the wrist plate O of the inlet valves and by a rod $m$ with the wrist plate O of the exhaust valves. The rod $m$ is connected with a sword arm S' forming a part of the rocker, by a sliding pivot block T'. The arc of this sword arm intersects the axis of oscillation of the rocker so that if the pivot block is moved on the sword arm into a position opposite the center about which the rocker oscillates, the exhaust valves will be set at rest in their central or closed position. A lever $n$ is connected by a rod $t'$ with the pivot block T' and at the opposite end with the piston of a cylinder $o$, by which it is shifted from one extreme position to the other. In the working position of the pivot block T' the pivot connection between the lever $n$ and the rod connecting it with said block is preferably made to coincide with the center on which the rocker P' oscillates, so that in this position of the parts there will be no slip or relative movement of the pivot block on the sword arm. The stroke of the piston in cylinder $o$ is such as to shift the pivot block T' from its working position to a point in line with the center of oscillation of the rocker P', so that in this position both the pivot block and the rod connecting it with the lever $n$ will remain at rest.

The lever $n$ is connected with a vertically movable stand $p$ carrying a lever $q$, which is connected by a rod $r$ with an arm of the operating lever $a'$, and by a rod $s$ with a lever $c'$. The lever $c'$ is connected by a rod with the trip lever $c$ of the inlet valves, as shown in Fig. 2, or in any other convenient and suitable manner. With an arm of the lever $a'$ is connected the valve $t$ which controls the admission and release of compressed air or other actuating medium to and from opposite ends of the cylinder $o$.

The mechanism last described operates as follows: When the lever $a'$ is in its extreme position $a^2$ at the left, the valve $t$ is in its lowest position and admits air to the lower end of the cylinder $o$ below the piston, while the space above it is open to exhaust. The pivot block T' is thus held with the lever $n$ in its working position, so that the exhaust valves perform their normal functions in the usual manner. The lever $q$ is now in the position $s'$ and the lever $c'$ in the corresponding position $c^2$, in which the inlet valves are not released and air is admitted to the engine cylinder during nearly the full stroke of the piston, producing the indicator card or diagram 2, Fig. 9. As the lever $a'$ is moved in the direction of the arrow, the releasing gear of the inlet valves is brought into action, cutting off air earlier in the stroke. The driving power applied to the engine is thus gradually reduced according to the indicator diagrams 3 to 8 inclusive, Fig. 9. The movement of the lever $a'$ above mentioned also carries the valve $t$ upward, but as this valve has considerable travel, such movement has no effect on the piston in cylinder $o$, until said lever arrives at an intermediate position, in which it is shown by full lines in Fig. 5. In this position of the operating lever the lever $q$ occupies the position in which it is shown by full lines, and the lever $c'$ a corresponding position, also shown by full lines. In this position of the lever $c'$ the inlet valves remain closed, and the indicator card of no work, 8, Fig. 9, is produced. If now the operating lever is moved farther in the direction indicated by the arrow, the valve $t$ will pass above its central position, admitting air to the upper end of the cylinder $o$ and opening the lower end thereof to exhaust, thus causing the piston to instantly descend to its lowest position. The lever $n$ is thereby turned into the position $n'$, shifting the pivot block T' into its position opposite the center of oscillation of the rocker P' and setting the exhaust valves at rest in their closed position. At the same time the stand $p$ is moved downward to its lowest position, carrying the fulcrum of the lever $q$ to the position $q'$. The end of the lever $q$ connected with the rod $r$, will during this movement of the stand, very nearly retain its former position, so that the lever $q$ now occupies the position $s^2$, $q'$, $r'$. As the two points $s^2$ and $s^3$ are equidistant from the point $c^3$ which indicates the position of the lever $c'$, at which the inlet valves are released and closed at such a point that the volume of air admitted to the engine cylinder will expand to atmospheric or exhaust pressure at the end of the stroke and be recompressed to the pressure in chest I on the return stroke, it is evident that the position of the lever $c'$ and hence of the trip cams M of the inlet valves, will be exactly the same for both the positions of the lever $q$ designated by $s^2$ and $s^3$. Now $c^3$ designates the position of the lever $c'$ at which the inlet valves are released and closed at such a point that the air admitted by them into the cylinder will expand to atmospheric or exhaust pressure at the end of the piston stroke and be recompressed to the chest or reservoir pressure by the return stroke of the piston, according to the indicator diagram 12, Fig. 11. The points $s$ and $s^4$ are equidistant from the point $c^4$, which designates the position of the lever $c'$ in which the inlet valves remain inactive and closed.

It will be clear from the foregoing that when the operating lever passes its middle position $a'$, the exhaust valves are set at rest in their closed position, and at the same time the point of cutoff of the inlet valves is adjusted to correspond with the indicator diagram 12, Fig. 11. A further movement of the operating lever in the same direction produces an earlier cutoff, resulting in a gradual increase of the retarding power applied to the engine, as illustrated by diagrams 20, 22, 23, 24, Fig. 11. When the lever $a'$ reaches its extreme position $a^3$, the lever $q$ assumes the position $r^2$, $q'$, $s^4$, at which the point of cutoff of the inlet valves is the same as when the operating lever is in its intermediate position $a'$ and the levers $q$ and $c'$ occupy the relative positions in which they are shown by full lines.

Method 3: According to this method the releasing gear is adjusted to close the inlet valves at such a point in the stroke that the volume of air admitted by them to the cylinder will expand to atmospheric or exhaust pressure at the end of the stroke and will be compressed to the pressure in the chest or reservoir by the return stroke of the piston. This point of cutoff remains constant. The exhaust valves are provided, as shown in Fig. 2, with variable trip mechanism or releasing gear, the same as for method 1, and means, such as a sword arm or its equivalent, are employed to render the inlet valves temporarily inactive when closed. The driving power is varied by releasing and closing the exhaust valves at different points of the stroke and compressing the air thus confined in the cylinder to the pressure in the pressure chest I or reservoir B. The retarding power is varied the same as in Method 1, by changing the point of release of the exhaust valves while the inlet valves are held closed and inactive. Fig. 6 shows mechanism suitable for this method of regulation and similar to that shown in Fig. 5 for Method 2. This mechanism comprises a rocker $P^2$ connected by a rod $k$ with the actuating eccentric. The rocker is however, reversed, and the inlet valve rod $l$ is connected with the sword arm. This involves also a reversal of the position of the piston in the cylinder $o$, and the valve $t$ has to be connected with an arm on the opposite side of the operating lever $a$, the direction of movement of said lever for producing like results remaining the same. The stand $p$ is connected with the lever $n$ on the opposite side of its fulcrum from the corresponding connection, shown in Fig. 5. The exhaust valves may be operated by the eccentric which operates the inlet valves, through a rod $m$ connecting the exhaust wrist plate O with the rocker $P^2$. When the operating lever is in its middle position, as shown by full lines, the piston in cylinder $o$ is at the lower limit of its movement, and the pivot block T' is held thereby in its operative position on the sword arm S'. The lap of the inlet valves is so proportioned and the eccentric which operates them is so set that the admission of air to the cylinder will be cut off at such a point in the stroke of the piston that the volume of air admitted to the cylinder will expand to atmospheric or exhaust pressure at the end of the stroke, as shown by diagram 25, Fig. 12, this diagram representing the full power indicator card according to this method of regulation. According to this diagram, air is admitted from point 26 to point 27, and from the latter point expands to atmospheric or exhaust pressure at 28, the end of the stroke. The exhaust valves open at or near the end 28 of the stroke, and are closed positively at 29. If the operating lever is moved in the direction of the arrow from $a^4$, Fig. 6, toward its middle position $a$, the driving power applied to the engine will be gradually reduced according to the series of diagrams or indicator cards 30, 31 and 32, Fig. 12, the release and closing of the exhaust valves taking place earlier during the return stroke as the operating lever approaches its middle position. At point 33 in diagrams 30, 31 and 32, the compression reaches or slightly exceeds the pressure in the chest I, opening the automatic discharge valves H or H' and forcing the air thus compressed into said chest and the reservoir B. When the operating lever is in position $a$ and the valve $t$ is in its central position ready to reverse the position of the piston in cylinder $o$, the levers $q$ and $c'$ occupy the positions shown by full lines, in which the exhaust valves will not be opened. With this adjustment of the valve controlling and releasing gear, the indicator card or diagram 34, Fig. 12, will be produced. It will be observed that this card exactly corresponds with the card or diagram 12, Fig. 11. When the lever $a$ is moved still farther to the right, the position of the piston in cylinder $o$ will be reversed and the inlet valves thus rendered inoperative by the shifting of the lever $n$ and the pivot block T' connected therewith to the position indicated by dotted line $n^2$. At the same time, the stand $p$ is carried down and the lever $q$ assumes the position $r^3$, $q^2$, $s^5$, or the position of non-release. As no air is admitted into the cylinder through the inlet valves, whatever air there is in the clearance spaces expands to atmospheric pressure, as shown by the diagram or indicator card 35, Fig. 12, this diagram corresponding exactly with the diagram or card 8, Fig. 9. At 36 the suction valve or valves G opens, admitting air into the cylinder up to the point 37 in the stroke, where the exhaust valve opens. On the return stroke of the piston the exhaust valve remains open up to the point 38, when it closes and the air confined in the small space between the piston and adjacent cylinder head is recompressed into the clearance space. A further movement of the operating lever in the same direction will gradually increase the retarding power developed by and resisting the movement of the engine according to the series of indicator cards 9, 10 and 11, Fig. 10, as in Method 1, until the operating lever reaches its extreme position $a^5$ at the right, and the retarding power is developed and applied with its greatest force.

It is obvious that the engine cylinders may be so proportioned that the compressed air will expand therein to atmospheric or exhaust pressure at the end of the piston stroke, as shown by diagram 4, Fig. 9, or diagram 25, Fig. 12, when the maximum accelerating or driving power is applied according to any of the three methods hereinbefore described. In this way the compressed air will be used with the greatest possible economy, or the maximum energy or amount of work will be obtained from a given volume of compressed air.

In the embodiment of the invention in engines for various kinds of work under different conditions, various changes in details of construction and arrangement of parts may be made without departing from the principle and intended scope of the invention.

I claim:

1. The combination with a compressed air reservoir, of an engine connected therewith and provided with separate inlet and exhaust valves and with suction and discharge valves, valve operating gear and means for adjusting said gear to change the time of closing the inlet valve relative to the exhaust valve and to vary the driving power applied to the engine, substantially as described.

2. The combination with a compressed air reservoir, of an engine connected therewith and provided with separate inlet and exhaust valves and with suction and discharge valves, valve operating gear and means for adjusting said gear to change the time of closing the exhaust valve and to vary the retarding power applied to the engine, substantially as described.

3. The combination with a compressed air reservoir, of an engine connected therewith and provided with separate inlet and exhaust valves and with suction and discharge valves, valve operating gear and means for adjusting said gear to gradually change the time of closing the inlet and exhaust valves to vary one after the other the driving power and the retarding power applied to the engine, substantially as described.

4. The combination with a compressed air reservoir, of an engine connected therewith and provided with separate inlet and exhaust valves and with self-acting suction and discharge valves, automatic gear for operating the inlet and exhaust valves, means for preventing the opening of the inlet valve, and means for varying the time of closing of the exhaust valve while the inlet valve remains inactive and closed, substantially as described.

5. The combination with a compressed air reservoir, of an engine provided with separate inlet and exhaust valves and with self-acting suction and discharge valves, the inlet and discharge valves communicating with said reservoir and the suction valve with the atmosphere, valve operating and releasing gear, and means for adjusting said gear to vary the time of closing the inlet valve relative to the exhaust valve, substantially as described.

6. The combination with a compressed air reservoir, of an engine provided with separate inlet and exhaust valves and with self-acting suction and discharge valves, the inlet and discharge valves communicating with said reservoir and the suction valve with the atmosphere, valve operating and releasing gear and means for adjusting said gear to vary the time of closing the exhaust valve relative to the inlet valve, substantially as described.

7. The combination with a compressed air reservoir, of an engine provided with inlet and exhaust valves and with self-acting suction and discharge valves, the inlet and discharge valves communicating with said reservoir and the suction valve with the atmosphere, valve operating and releasing gear and means for adjusting said gear to vary the time of closing the inlet and exhaust valves one after the other, substantially as described.

8. The combination with a compressed air reservoir, of an engine provided with inlet and exhaust valves and with suction and discharge valves, valve operating and releasing gear, means for setting the inlet valve closed and means for varying the time of closing of the exhaust valve, substantially as described.

9. The combination with a compressed air reservoir, of an engine provided with inlet and exhaust valves and with suction and discharge valves, and means for setting the inlet valve closed and rendering it inactive while the exhaust valve remains active, substantially as described.

10. In an engine the combination with separate inlet and exhaust valves, of suction and discharge valves, valve operating gear, means for setting the inlet valve closed and rendering it inactive, and means for adjusting the valve gear to close the exhaust valve during the compressing stroke of the engine piston while the inlet valve is inactive, substantially as described.

11. In an engine the combination with inlet and exhaust valves and with suction and discharge valves, valve operating gear, means for setting the inlet valve closed and rendering it inactive, and means for adjusting the valve gear to vary the time of closing the exhaust valve during the compressing stroke of the engine piston, substantially as described.

12. In an engine the combination of a cylinder provided with separate positively actuated inlet and exhaust valves and with self-acting suction and discharge valves, valve operating gear and means for adjusting said gear so as to gradually change the time of closing of one positively actuated valve relatively to the other, and thereby gradually vary the power applied to drive the engine, substantially as described.

13. In an engine the combination of a cylinder provided with separate positively actuated inlet and exhaust valves and with self-acting suction and discharge valves, valve operating gear, and means for adjusting said gear to gradually vary the power developed by and tending to retard the engine, substantially as described.

14. In an engine the combination of a cylinder provided with separate positively actuated inlet and exhaust valves and with self-acting suction and discharge valves, valve operating gear and means for adjusting said gear to first gradually diminish the power applied to drive the engine and then to gradually increase the power developed by and tending to retard the engine or vice versa, substantially as described.

15. In an engine the combination of a cylinder provided with separate positively actuated inlet and exhaust valves and with self-acting suction and discharge valves, valve operating gear and means for adjusting said gear to convert the engine from a motor to a compressor and vice versa, substantially as described.

16. In an engine the combination of a cylinder provided with separate adjustable inlet and exhaust valves and with self-acting suction and discharge valves, valve gear for operating the inlet and exhaust valves, and means for adjusting said gear to convert the engine from a motor to a compressor and vice versa, substantially as described.

17. The combination with a compressed air reservoir of an engine connected therewith and provided with separate inlet and exhaust valves and with self-acting suction and discharge valves, the inlet and discharge valves communicating with said reservoir and the suction valve with the atmosphere, gear for operating the inlet and exhaust valves and means for adjusting said gear to convert the engine from a motor to a compressor and vice versa, substantially as described.

18. In an engine the combination of a cylinder provided with separate inlet and exhaust valves and with self-acting suction and discharge valves, gear for operating the inlet and exhaust valves, and means for adjusting said gear to convert the engine from a motor to a compressor and vice versa, and to gradually vary the driving power applied to the engine acting as a motor and the retarding power developed by the engine acting as a compressor, substantially as described.

19. In an engine the combination of a cylinder provided with separate inlet and exhaust valves and with suction and discharge valves, automatic valve operating and releasing gear and means for adjusting said gear at will to gradually diminish the power applied to drive the engine from its full force to zero, to then convert the engine from a motor into a compressor, and to gradually increase the retarding power developed by the engine acting as a compressor and vice versa, substantially as described.

20. The combination of a compressed air reservoir, an engine provided with inlet and exhaust valves and with suction and discharge valves, valve operating gear, means for adjusting said gear to convert the engine from a motor into a compressor, and to vary the driving power applied to the engine acting as a motor and the retarding power developed by the engine acting as a compressor, a heater arranged to heat the compressed air supplied to the engine from said reservoir and a by-pass around the heater for conducting compressed air from the engine to the reservoir, substantially as described.

21. The combination of a compressed air reservoir, an engine provided with valves and valve operating gear, means for adjusting the valve operating gear to convert the engine from a motor into a compressor, an air supply connection between the reservoir and engine, a heater adapted to heat the compressed air passing through said connection to the engine, and an air return connection between the engine and reservoir independent of the heater, substantially as described.

22. The combination of a compressed air reservoir, an engine connected with said reservoir, valve mechanism controlling the supply and delivery of air from one to the other, means for adjusting said valve mechanism to convert the engine from a motor into a compressor and vice versa, and means for adjusting said valve mechanism to gradually vary the volume of air compressed and delivered into said reservoir by the engine when it is acting as a compressor.

23. The combination of a compressed air reservoir, an engine connected therewith, valve mechanism controlling the supply and delivery of air from one to the other, means for adjusting said valve mechanism to convert the engine from a motor into a compressor and vice versa, means for adjusting said valve mechanism to gradually vary the driving power applied to the engine when it acts as a motor and to gradually vary the volume of air compressed and delivered into said reservoir by the engine when it acts as a compressor.

In witness whereof I hereto affix my signature in presence of two witnesses.

BRUNO V. NORDBERG.

Witnesses:
E. H. HOLMES,
CHAS. L. GOSS.